US008200850B2

(12) United States Patent  (10) Patent No.: US 8,200,850 B2
Dam et al.  (45) Date of Patent: Jun. 12, 2012

(54) METHOD, APPARATUS AND COMPUTER PROGRAM PRODUCT FOR RING NETWORK COMMUNICATION

(75) Inventors: Hai Thanh Dam, Cedar Park, TX (US); Ernest Amador Cisneros, Leander, TX (US); Daniel Lee McLaughlin, Cedar Park, TX (US); Nick Verlenich, Jr., Leander, TX (US)

(73) Assignee: Weed Instrument, Inc., Round Rock, TX (US)

( * ) Notice: Subject to any disclaimer, the term of this patent is extended or adjusted under 35 U.S.C. 154(b) by 663 days.

(21) Appl. No.: 12/269,007

(22) Filed: Nov. 11, 2008

(65) Prior Publication Data

US 2009/0125639 A1  May 14, 2009

Related U.S. Application Data

(60) Provisional application No. 60/987,086, filed on Nov. 11, 2007.

(51) Int. Cl.
*G06F 15/16* (2006.01)

(52) U.S. Cl. ........ 709/251; 714/717; 370/222; 370/223; 370/224

(58) Field of Classification Search .................. 709/251; 714/717; 370/222–224
See application file for complete search history.

(56) References Cited

U.S. PATENT DOCUMENTS

| 28,958 | A | * | 7/1860 | Blood et al. | 52/165 |
|---|---|---|---|---|---|
| 3,859,468 | A | * | 1/1975 | Smith et al. | 370/228 |
| 4,446,551 | A | * | 5/1984 | Seo | 370/224 |
| 4,573,044 | A | * | 2/1986 | McConachie et al. | 370/224 |
| 4,850,042 | A | * | 7/1989 | Petronio et al. | 398/176 |
| 5,159,595 | A | * | 10/1992 | Flanagan et al. | 370/224 |
| 6,307,652 | B1 | * | 10/2001 | Fassih-Nia et al. | 398/4 |
| 6,430,151 | B1 | * | 8/2002 | Glas et al. | 370/222 |
| 6,697,874 | B1 | * | 2/2004 | Friden et al. | 709/240 |
| 6,763,190 | B2 | | 7/2004 | Agrawal et al. | |
| 6,766,482 | B1 | * | 7/2004 | Yip et al. | 714/717 |
| 6,782,198 | B1 | | 8/2004 | Liu | |
| 6,892,329 | B2 | * | 5/2005 | Bruckman | 714/43 |
| 6,928,050 | B2 | * | 8/2005 | Lynch et al. | 370/224 |
| 6,980,745 | B2 | | 12/2005 | Deguchi et al. | |
| 6,999,452 | B1 | * | 2/2006 | Drummond-Murray et al. | 370/389 |
| 7,035,537 | B2 | | 4/2006 | Wang et al. | |

(Continued)

OTHER PUBLICATIONS

2C30 Self-Healing Ring Module Installation Instructions, Jun. 2004, Weed Instrument Co., Inc., Round Rock, TX.

(Continued)

*Primary Examiner* — Emmanuel L Moise
*Assistant Examiner* — Sarah Drabik
(74) *Attorney, Agent, or Firm* — Anthony V. S. England

(57) ABSTRACT

Communication modules are coupled in a communication ring and are operable to send and receive data from peripheral devices. The modules are operable to send and receive data streams on paths of the ring, and each module is operable, responsive to receiving a predetermined initialization signal, to operate as a master for initially blocking data in the first path and initially sending a block signal to a neighboring module downstream in the second path. The modules are operable, responsive to receiving the block signal in one of the paths, to block data in that one of the paths, so that responsive to initialization of one of the modules as a master, the master and the neighboring module create an inactive virtual link therebetween in order to prevent data from propagating around the ring more than once.

19 Claims, 6 Drawing Sheets

U.S. PATENT DOCUMENTS

| | | | |
|---|---|---|---|
| 7,039,312 B1 | 5/2006 | Condict et al. | |
| 7,269,346 B1 | 9/2007 | Iyer et al. | |
| 7,277,631 B1 | 10/2007 | Iyer et al. | |
| 7,295,776 B2 | 11/2007 | Okubo et al. | |
| 7,298,693 B1 | 11/2007 | Owens et al. | |
| 7,315,510 B1 | 1/2008 | Owens et al. | |
| 7,339,887 B2* | 3/2008 | Griswold et al. | 370/216 |
| 7,606,240 B1* | 10/2009 | Shah | 370/400 |
| 2003/0133444 A1* | 7/2003 | Wakamatsu et al. | 370/355 |
| 2004/0081083 A1* | 4/2004 | Sekihata | 370/222 |
| 2004/0131354 A1 | 7/2004 | Kim et al. | |
| 2004/0223503 A1* | 11/2004 | Lynch et al. | 370/404 |
| 2005/0201409 A1* | 9/2005 | Griswold et al. | 370/445 |
| 2006/0224659 A1 | 10/2006 | Yu | |
| 2006/0245351 A1* | 11/2006 | Pande et al. | 370/216 |
| 2007/0008964 A1* | 1/2007 | Rose et al. | 370/389 |
| 2007/0206618 A1 | 9/2007 | Zelig | |
| 2007/0242604 A1 | 10/2007 | Takase | |
| 2008/0170495 A1 | 7/2008 | Monse | |
| 2008/0222447 A1 | 9/2008 | Ram | |
| 2010/0034204 A1 | 2/2010 | Sakauchi | |

OTHER PUBLICATIONS

2C23 Profibus Compatible Self-Healing Electrical Interface Installation Instructions, Dec. 2005, Weed Instrument Co., Inc., Round Rock, TX.

2C30 Self-Healing Ring Module Product Catalog page, Jun. 2004, Weed Instrument Co., Inc., Round Rock, TX.

2C23 Profibus Compatible Self-Healing Electrical Interface Product Catalog page, Dec. 2005, Weed Instrument Co., Inc., Round Rock, TX.

ControlNet International Specification, Version 2.0, Mar. 31, 1998 (including errata 1, Jul. 1, 1999 and errata 2, Dec. 31, 1999), ControlNet, Boca Raton, FL.

Allen-Bradley ControlLogix ControlNet Interface Module User Manual, Publication 1756-6.5.3, Dec. 1999, Rockwell Automation, Mayfield Heights, OH.

Allen-Bradley ControlLogix Redundancy System User Manual, Publication 1756-UM523F-EN-P, Dec. 2006, Rockwell Automation, Mayfield Heights, OH.

Allen-Bradley ControlNet Coax Media Planning and Installation Guide, Publication CNET-IN002A-EN-P, Dec. 2001, Rockwell Automation, Mayfield Heights, OH.

Allen-Bradley ControlNet Fiber Media Planning and Installation Guide, Publication CNET-IN001B-EN-P, Jul. 2004, Rockwell Automation, Mayfield Heights, OH.

Oct. 15, 2010__12269015__NonfinalOfficeAction.
Jan. 16, 2011__12269015__ResponseToNonfinalOfficeAction.
Mar. 20, 2011__12269015__SupplementalResponse.
Apr. 19, 2011__12269015__NoticeOfAllowance.

* cited by examiner

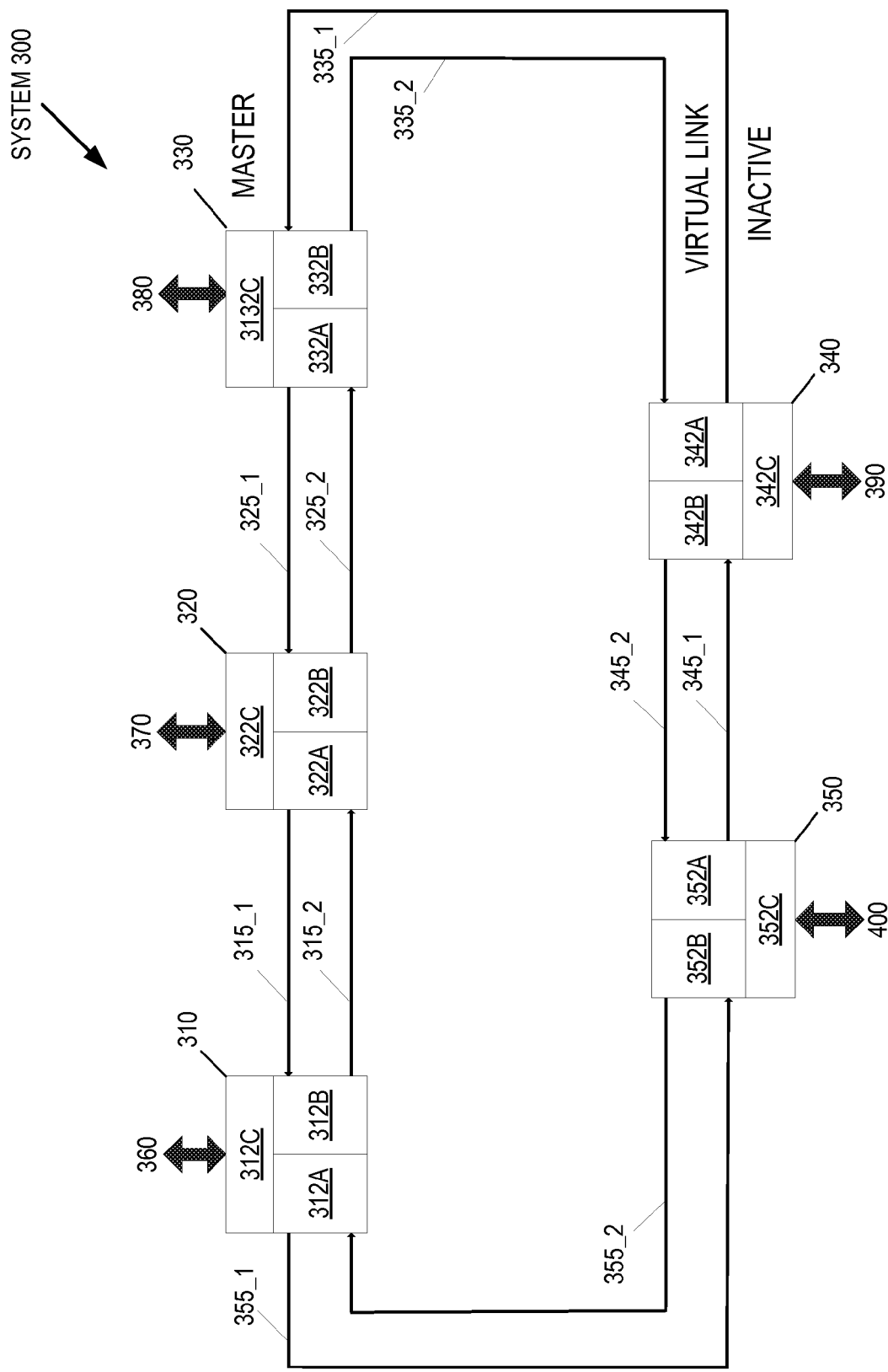

METHOD, APPARATUS AND COMPUTER PROGRAM PRODUCT FOR RING NETWORK COMMUNICATION

CROSS-REFERENCE TO RELATED APPLICATION

This application is related to METHOD, APPARATUS AND COMPUTER PROGRAM PRODUCT FOR REDUNDANT RING COMMUNICATION, which is assigned to the same assignee of the present application, filed on the same date as the present application, and is hereby incorporated herein by reference; and is related to and claims priority pursuant to 35 U.S.C. 199 to provisional U.S. Patent Application Ser. No. 60/987,086 entitled "Universal Self-Healing Ring," filed Nov. 11, 2007.

BACKGROUND OF THE INVENTION

1. Field of the Invention

This invention relates to communication systems and particularly to such systems for use in industrial control applications. More particularly, the invention relates to a ring-configured, network communication system that continues uninterrupted communication even in the event of a failure in communication lines.

2. Background

Industrial control systems are used in industrial processes to control pressures, temperatures, mass transfers, and other process parameters. Control systems may include many input/output devices such as temperature sensors, pressure sensors, pressure regulators, and other similar devices positioned at various locations in the process equipment being controlled. Modern control systems also include one or more programmable logic controllers (PLCs) for controlling various input/output devices in the system, based upon data collected from the input/output devices and based upon instructions programmed on the controller.

These input/output devices and PLCs must communicate with each other in order for the control system to provide the desired control for the process. Both data and instructions must be communicated between devices in the control system. Thus, an industrial control system requires a communication arrangement to enable the various control system devices to communicate with each other.

Some industrial processes may require very precise control. Failure of communications between the various elements of an industrial control system may upset the entire process and have dire results. For example, failure of process control communications in a chemical manufacturing process may result in the production of an entirely different chemical than what was intended. Thus, a communications failure in an industrial control system may require that the entire process being controlled be aborted or at least suspended until communication is reestablished. Also, failure of communication and control in some processes may pose very serious safety risks. Therefore, the communication systems employed in industrial control systems must be very robust.

It is a difficulty in this situation that communication lines required between various elements of an industrial control system must commonly traverse harsh environments or areas of high activity. In these areas, there is a constant danger of damage to the communication lines resulting in a loss of communication in the control system. Also, conditions in some areas of an industrial process may interfere with certain types of transmissions. For example, electrical noise in certain areas of a plant may interfere with electrical transmissions.

To deal with these situations and others, data and instructions may be converted to optical signals for transmission between the various control system devices through optical fibers. Also, the various elements of an industrial control system may be connected for communications in a ring configuration that allows communications in both directions around the ring. In this closed ring configuration, a single break in the ring does not cause a loss of communications since communication is still possible in the opposite direction from the location of the break. Closed communications rings, however, raise the problem of signal oscillation, which interferes with communications.

One way to solve the problem of ensuring communications in the event of a failure along a communication path in an industrial process control system is to provide multiple communication paths between the various elements of the system. In the event of a failure on one communication path, communications are still maintained along a secondary path. Since uncontrolled duplicate messages in a multi-path network can give rise to a message storm, which continually delivers redundant messages and locks up the network, great care must be taken in this situation.

Still further complications arise due to the nature of communications in an industrial control system. While some communications of data and instructions may be relatively continuous in some process control applications, communications may be infrequent in other control systems. In situations in which long gaps appear between data or instructions, a communication failure may not be readily apparent. That is, a system that monitors for communication failures may mistake a communication fault for a gap in data, or may mistake a gap in data for a communication fault. Thus detecting a failure in the communication process presents difficulties in an industrial control system.

In one system described in U.S. Pat. No. 6,307,652 issued Oct. 23, 2001, which is hereby incorporated herein by reference, a "control unit" is included in a duplex optical communication ring not to interface a peripheral device to the ring, but to operate, at least in some respects, as a master unit to control aspects of communication within the ring, which includes initially blocking data in both paths of the ring, i.e., in both the send and receive directions of a transmit and receive port of the control unit, which are connected to respective fiber links. Data units are included in the optical ring and are operable both to interface respective control or data acquisition system devices to the ring and also to control aspects of communication within the ring, i.e., as slaves to the control unit in at least some respects. Responsive to detection of a break in a fiber link, the system moves the location of the blocking. That is, if one of the data units detects a break, it responsively blocks data at the location of the break and signals the control unit to stop blocking.

SUMMARY OF THE INVENTION

In one form of the invention, an apparatus includes communication modules coupled together in a communication ring, the modules being operable to send and receive data from peripheral devices. The ring includes a first path operable for propagating a data stream, including control signals and data, from module to module around the ring in a first direction and a second path operable for propagating a data stream, including control signals and data, from module to module around the ring in a second direction. The modules are operable to send and receive the data streams on the paths, and each module is operable, responsive to receiving a predetermined initialization signal, to operate as a master for initially blocking data in the first path and initially sending a block signal to a neighboring module downstream in the second path. The modules are operable, responsive to receiving the block signal in one of the paths, to block data in that one of the paths, so that responsive to initialization of one of the modules as a master, the master and the neighboring module create an inactive virtual link therebetween in order to prevent data from propagating around the ring more than once.

In another aspect, the modules are operable to send and receive the data as data packets in the data streams and the master sends the block signal with each data packet responsive to receiving a heal signal between data packets. The heal signal indicates no break has been detected in any location other than at the virtual link. The master is further operable to send an unblock signal in the second path responsive to receiving a break signal between data packets. The break signal indicates a break in a location other than at the virtual link. The modules are operable, responsive to receiving an unblock signal in one path, to stop blocking block data in that one path.

In another aspect, the non-master modules are further operable to respond to receiving a break signal by relaying the break signal around the ring to the master.

In another aspect, the modules are further operable to detect and respond to upstream breaks in the paths. Responding to an break in a broken one of the paths includes blocking data in the broken path, sending a break signal to a neighboring module downstream of the break in the broken path, and sending a block signal to a neighboring module in the other one of the paths, so that the module receiving the block signal from the break-detecting module blocks data in the other path, and so that the break signal is relayed to the master and the master and the neighboring module downstream of the master in the second path create an active virtual link in order to allow data to propagate around the ring in spite of the break.

In another aspect, the modules are operable to send the block signals as tags appended to the data packets.

In another aspect, the modules are operable to send and receive the break signals as carrier signals between packets.

In another aspect, each module includes shift registers for each path and fault logic coupled to the respective shift registers, wherein each of the modules is operable to shift a received data stream through its respective shift register and the fault logic is operable to insert the break and block signals into the received data stream.

In another aspect, each module is operable to repeatedly send heal codes to adjacent modules in the ring except when sending data packets, so that the receiving modules can detect communication is intact.

In another form of the invention, a method of communicating in a ring network includes an initializing step in which a first link in the ring is initialized to block data packet communication in order to prevent duplicate messages from being delivered in the ring. The initializing includes a master communication module sending a block tag in a data packet on the first link. The method further includes deactivating a second link in the ring responsive to a break occurring in the second link, wherein the second link is non-adjacent to the master communication module and is between two adjacent communication modules. Further, the break is reported to the master communication module by a communication module communicating between data packets in the ring. The master communication module activates the first link by responsive to the break report, so that first link provides a replacement for the second link and messages can still be delivered around the ring in spite of the break.

In another aspect, the method includes re-activating the second link responsive to detecting that the second link no longer has a break, and reporting the non-break in the second link to the master communication module by a communication module communicating between data packets in the ring.

In another aspect, the method includes de-activating the first link again by the master communication module responsive to the non-break report, so that first link again prevents duplicate messages from being delivered in the ring.

In another aspect, the ring includes a number of communication modules, each of the modules being capable of operation as the master communication module responsive to receiving a predetermined initialization signal. The initializing step includes initializing one of the modules to operate as the master module. Responsive to the initializing the master module blocks data in a first path of the first link and initially sends a block signal to a neighboring module downstream in a second path of the first link. The modules, responsive to receiving the block signal in one of the paths, block data in that one of the paths, so that responsive to the initializing step the master and the neighboring module downstream initialize the first link as an inactive virtual link in order to prevent data from propagating around the ring more than once.

Computer program products including some or all aspects of the above-summarized methods and apparatuses are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

FIG. 3A illustrates optical fiber ring communication between media modules in an intact fiber ring, according to an embodiment of the invention.

DETAILED DESCRIPTION

Figure 1A:
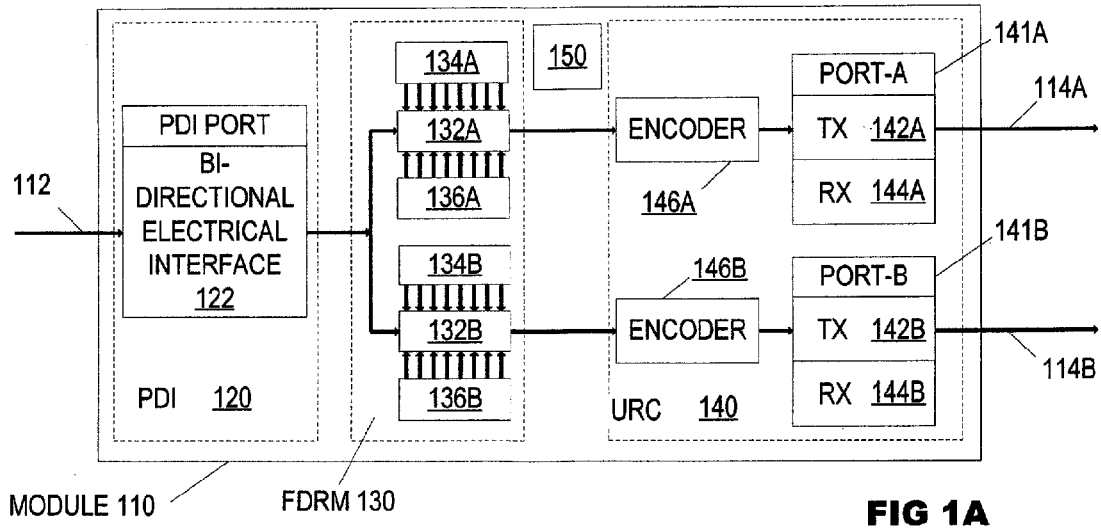
FIG. 1A illustrates a communication module (also referred to as a "Weed media module") according to an embodiment of the invention, where the module is receiving a data packet at an electrical network input of the module and sending to optical outputs of the module to a optical fiber ring.

In the following detailed description of the preferred embodiments, reference is made to the accompanying drawings illustrating embodiments in which the invention may be practiced. It should be understood that other embodiments may be utilized and changes may be made without departing from the scope of the present invention. The drawings and detailed description are not intended to limit the invention to the particular form disclosed. On the contrary, the intention is to cover all modifications, equivalents and alternatives falling within the spirit and scope of the present invention as defined by the appended claims. Headings herein are not intended to limit the subject matter in any way.

According to an embodiment of the present invention, a system includes N communication modules coupled in an optical communication network configured as a ring. Each of the modules includes an electrical interface operable to interface a respective local field bus electrical segment with control or data acquisition devices to the ring. Each module also includes respective pairs of optical ports, each port having a transmitter and a receiver. That is, each module is coupled, via transmit and receive ports and fiber optic cables or links, to a pair of neighboring modules in the ring.

More specifically, referring to the illustrated instance of FIG. 3A, system 300 has five modules 310, 320, 330, 340 and 350 coupled in an optical communication network configured as a ring. (Thus system 300 may also be referred to herein as ring 300.) Taking module 310 as one example, module 310 has an electrical interface, i.e., electrical communication port 312C, for communicating with local devices at node 360. Further, each module 310, 320, etc. has a first optical port and second optical port for communicating to others of the N modules. That is, taking module 310 as an example again, module 310 has a first optical port 312A and second optical port 312B for communicating to others of the five modules.

In one embodiment of the invention, modules 310, etc are not addressable devices on a ControlNet network, so they are not nodes in the sense that ControlNet defines "node." (ControlNet is a trademark of ControlNet International Ltd.) This application hereby incorporates by reference ControlNet International Specification 2.0 in its entirety.

From the standpoint of the ring network, the modules 310, etc. are members of nodes in at least the sense that they are active devices between fiber segments. Unless otherwise expressly indicated or clearly indicated at least from the context, the term "node" used herein generally refers to a node from the point of view of ring 300.

Still more specifically, one neighboring module 320 on one side of module 310 is coupled to module 310 via respective optical fiber links 315_1 and 315_2. That is, module 310 is coupled to module 320 by one link 315_2 coupled to a transmitter of transceiver port 312B of module 310 and to a receiver of transceiver port 322A of module 320, and by another link 315_1 coupled to a receiver of transceiver port 312B of module 310 and to a transmitter of transceiver port 322A of module 320. Likewise, module 310 is connected to its neighboring module 350 on the other side via respective optical fiber links 355_1 and 355_2. That is, module 310 is coupled to module 350 by one link 355_2 coupled to a receiver of transceiver port 312A of module 310 and to a transmitter of transceiver port 352B, and by another link 355_1 coupled to a transmitter of transceiver port 312A of module 310 and to a receiver of transceiver port 352B of module 350.

Thus, it should be understood that each optical communication port is connected to optical links in a manner such that the ports are coupled via the links in first and second parallel paths of a networking ring. Specifically, first path of ring 300 is formed by fiber optic links 315_1, 325_1, 335_1, 345_1, and 355_1 and by communication logic in module 310 between ports 312A & B, communication logic in module 320 between ports 322A & B, communication logic in module 330 between ports 332A & B, communication logic in module 340 between ports 342A & B, and communication logic in module 350 between ports 352A & B; second path of ring 300 is formed by communication logic in module 310 between ports 312A & B, communication logic in module 320 between ports 322A & B, communication logic in module 330 between ports 332A & B, communication logic in module 340 between ports 342A & B, communication logic in module 350 between ports 352A & B, and links 315_2, 325_2, 335_2, 345_2, 355_2.

Note that since a pair of fiber-optic links between two nodes may be thought of as a single, two-way communication path between the modules, the singular term "link" may also be used herein to refer to the pair of links between two modules.

A message is initiated, in at least some instances, by one of the modules 310-350 (which may be called an "initiating module") receiving a message from a local device via its electrical interface. For example, module 310 may receive a message from an upstream local device via electrical interface 312C for communication around ring 300, so that in such an instance module 310 is an initiating module. The modules are operable to send such a message via their optical communication ports such that instances of the message are sent both counterclockwise ("CCW") and clockwise ("CW") around ring 300 in FIG. 3. Accordingly, for each direction around ring 300 a given module has a neighboring (i.e., adjacent) module upstream and a neighboring module downstream. For example, in the CCW path around ring 300, module 320 is upstream and module 350 is downstream of module 310. In the CW path module 320 is downstream and module 350 is upstream of module 310.

Figure 1B:
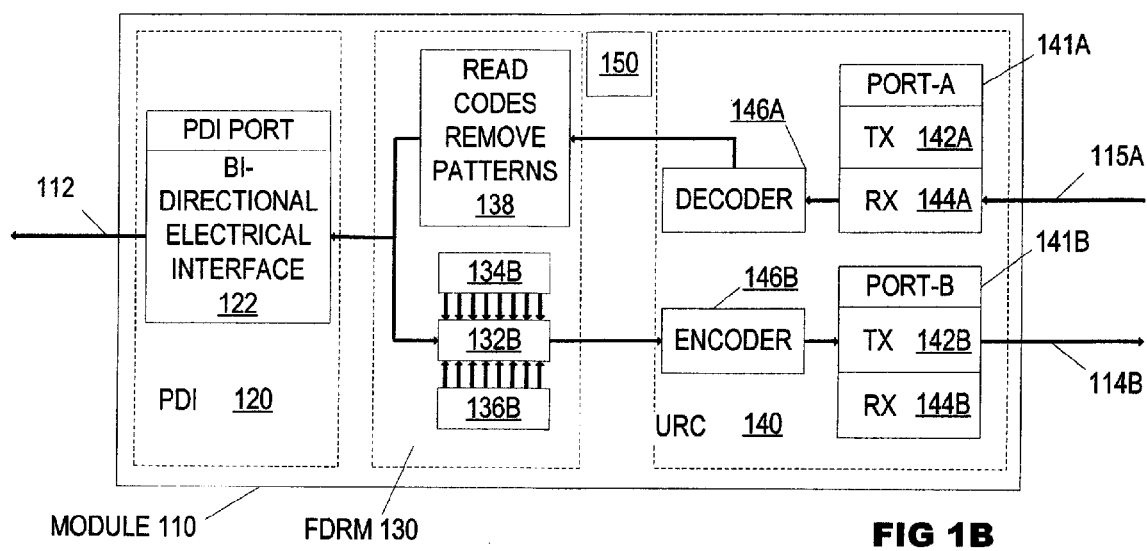
FIG. 1B illustrates the arrangement of FIG. 1A, wherein the module is receiving a data stream at one optical input and sending a packet from the data stream to the electrical network and the other optical fiber output, according to an embodiment of the present invention.

A universal self-healing ring ("USHR") is capable of receiving and transmitting data for many different protocols due to the unique way that modules of the ring communicate with each other over optical fiber. Referring now to FIG. 1A, one such module 110 is illustrated. (In an embodiment of the present invention, module 110 is an instance of modules 310, 320, etc.) Module 110 has an input node for receiving an electrical signal from a target network. The electrical signal communicates an incoming message (data packet 112) according to an industrial network protocol. The signal is received by protocol dependant interface ("PDI") logic 120 of module 110 and internally communicated to fault detection and ring management ("FDRM") logic 130, which converts the received signal into two instances of an electrical fault detection coded signal. FDRM logic 130 internally transmits the fault detection coded signal instances to universal ring communication ("URC") logic 140, which converts the electrical fault detection coded signal instances to optical signals and transmits them via respective output nodes around a fiber ring (not shown in FIG. 1).

In a ControlNet compatible embodiment of the invention, the signal received at PDI logic is a Manchester formatted data packet. In this case, URC logic converts the combined ControlNet Manchester formatted data and NRZ formatted fault codes received from FDRM logic to Manchester encoded signals. A module designed for a different protocol and/or using different transceivers in the input-output ports may require other encoded formats or no encoding all.

Figure 2A:
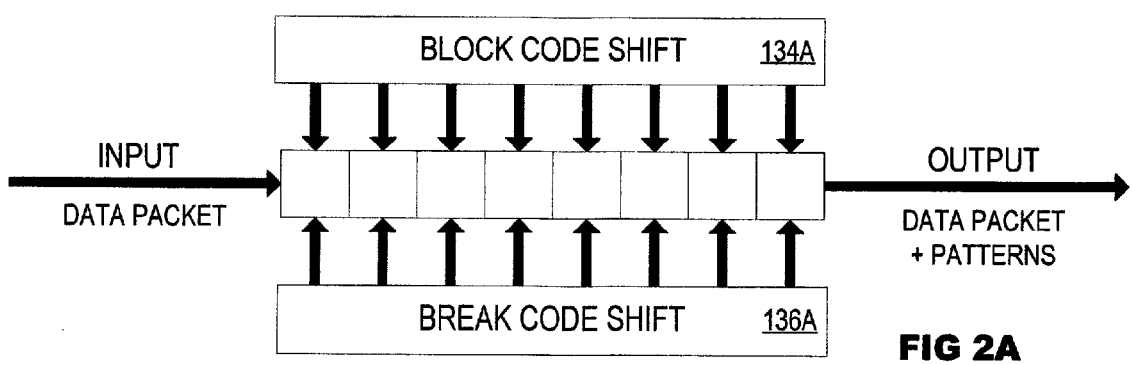
FIG. 2A illustrates a shift register and its relation to heal, break, block and unblock codes of a fiber status carrier, according to an embodiment of the invention.
Figure 2B:
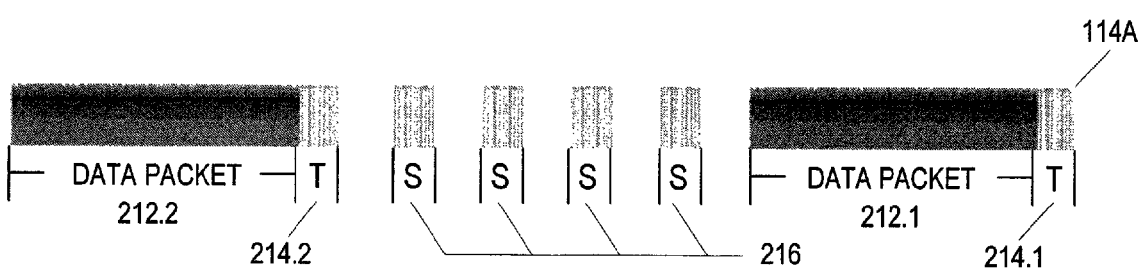
FIG. 2B illustrates a data stream with heal or break and block or unblock codes, according to an embodiment of the invention.

All received data packets 112 received by PDI 120 are shifted out to optical transmitters 142A and 142B through 8 Bit shift registers 132A and B, wherein FDRM 130 shifts fault detection patterns into the data stream. This is done in two ways. Referring now to FIGS. 2A and 2B, details are shown for shift register 132A and data stream 114A, according to an embodiment of the present invention. One way FDRM 130 transfers fault detection patterns into data stream 114A between modules is by message tagging. In this method, which is applicable for a ControlNet product, fault detection logic 134A shifts a None Return to Zero (NRZ) block pattern onto data packets 112 (FIG. 1A and individual packets 212.1 and 212.2 shown in FIG. 2B) in the form of a header, i.e., tag T (tags 214.1 and 214.2 shown in FIG. 2B) at the beginning of all packets 112, to transfer fault detection codes across the fiber to an adjacent module.

Another way FDRM 130 transfers fault detection patterns into data stream 114A is by break code shift logic 136A adding a message carrier S (instances 216 shown in FIG. 2B). Since ControlNet is a Manchester encoded signal, for this particular protocol an NRZ coded signal is selected for this carrier pattern to easily distinguish between data packets and carrier signals received. This fault detection pattern is also known as a fiber status carrier and is continually shifted into data stream 114A between all data packets 112 received. (Data packets are also received from 144A & B).

FDRM 130 shifts data packets 112 and fault detection patterns 214 and 216 out of the shift registers 132A and B to create two data streams 114A and B. Encoding logic 146A and B of URC 140 then Manchester encodes these data streams 114A and B before URC 140 transmits data stream 114A and B out onto the fiber ring in both directions; in one direction out port 141A and in the other direction out port 141B. Manchester encoding is used in this case to support a ControlNet product, for example, which incorporates small form-factor pluggable ("SFP") 155 Mb/s transceivers to transmit over optical fiber. The SFP transceiver sensitivity, jitter and pulse distortion can be degraded if a lower signal rate or a code where significantly lower frequency content is used.

In other embodiments of the invention, other encoding formats such as 8*b*/10*b* are used with SFP transceivers 141A and 141B. Also, in still other embodiments, these encoding formats are not necessary, such as when SFP transceivers are not used, for example.

Each fiber port 141A and B of URC 140 also has an optical receiver 144A and B and transmitter 142A and B. When a data stream 115A, for example, is received as shown at optical receiver 144A of port 141A in FIG. 1B, it is decoded by logic 146A. The received tag (e.g., 214.1 FIG. 2B) is read by FDRM 130. Tag 214.1 and all carriers 216 are stripped off data stream 115A by FDRM fault detection logic 138 logic and packet 112.1 is passed to the other ports, i.e., PDI 122 and optical port 141B, in the illustrated instance. If any data errors are detected in the packet it is discarded. The fault detection messages received in tag 214.1 and carrier 216 indicate whether the fiber ring is intact. This fault detection information 138 along with sensing loss of transmission at receiver 144A is reported to FDRM 130 which creates a block code logic 134A (FIG. 1A). This code is then shifted into data stream 114A and transmitted from port 141A. The status reported by receiver 114A is also used to determine what break codes are shifted out to each fiber port 141A and B, but several other determining factors described herein are used as well to create this code. The electrical interface of PDI 120 delivers data packet 112.1 without tag 214.1 and carrier 216, since they are not useful to the industrial network. These codes are entirely used to detect faults which are used to properly manage the ring environment and cannot be passed to the host network.

As previously stated, tag T (FIG. 2B) transmitted from port 141B contains a status code derived from the state of the Port 141B receiver 144B. This is because a break in transmission can only be determined by the receiver of a communication port, so when a receiver detects a loss of transmission the receiver reports this fault to FDRM 130, which shifts a block code into the tag of each packet for the transmitter of the same port to send back to an adjacent module 110 to inform the adjacent module's port when a fiber break (no transmission received) has occurred between these two adjacent ports.

As mentioned earlier, fiber status carrier 216 (FIG. 2B) is continually transmitted between data packets 112. This status carrier 216 is continually added or extracted by FDRM 130 as it is transmitted or received. While the tag pattern 214 manages the state of the fiber between two adjacent modules according to the "block method," the carrier pattern 216 manages the state of a master module in the ring by the "break method." The block method is used to deactivate a fiber communication link between two adjacent modules, such as in the case of the port B (332B) connection of master module 330 with the adjacent module 340 (port 342A FIG. 3A). This connection or fiber segment, which includes paths 335_1 and 335_2, is known as the "Virtual Link". The break method is used to activate this same communication path in the virtual link when a fiber break is detected in another segment of the ring.

Figure 3B:
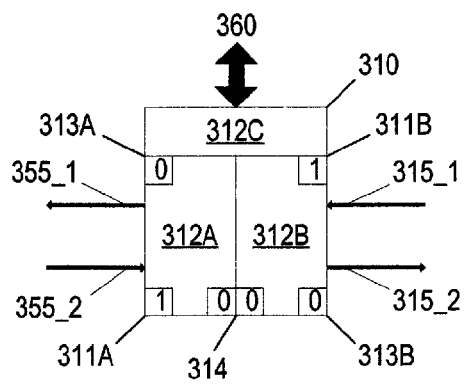
FIG. 3B illustrates media module block/unblock tag and status carrier in an intact ring, according to an embodiment of the invention.
Figure 3C:
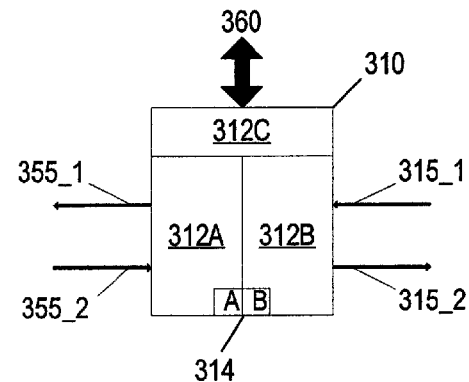
FIG. 3C illustrates a ring register in the context of a communication module, according to an embodiment of the invention.

URC 140 requires that a physical ring (or circle) of fiber is connected to provide two directions of communication to and from every module 110. FIG. 3B shows the state of a ring module 310 of FIG. 3A, as the state exists in an intact ring configuration. An industrial network connection or node at 360 has access to the fiber optic ring and transmits and receives data packets through an electrical connection to the module at PDI port 312C. When the URC receives a packet from PDI port 312C it will simultaneously transmit this packet in two directions; once from Port A (312A) out onto fiber 355_1 in one direction and also from Port B (312B) out onto fiber 315_2 in the opposite direction.

A typical problem with ring communication is stopping the continual retransmission of an original data packet or message which can be redundantly repeated throughout the network. A message originating at node 360, for example, should only be delivered to each node (370; 380; 390; 400) one time. This condition for replicated messages in a communication ring can continue to the point called a 'message storm' where the bandwidth is taken by replica messages and no new messages can enter the network. The result is that the network eventually becomes overloaded and shuts down. The arrangement described herein, the virtual link protects all network messages from repeating. Conversely, network nodes receive a message no more than once and the originator of a message never receives its own message back. Without this arrangement, problems would arise.

To provide this arrangement and thereby avoid this potential problem a method called "Downstream Multicasting" is employed. Referring again to FIG. 3A, the module uses downstream multicasting to transmit an incoming message from industrial network node 360 in multiple directions and away from a message's point of origin into ring 300. Upon accepting an incoming data packet, ring module 310 understands which port received this packet and transmits the message only out the remaining ports. When receiving a packet on the PDI port 312C; transmit is on Port A (312A) and Port B (312B). If received on Port A; transmit is on Port B and PDI port 312C. If received on Port B; transmit is on Port A and the PDI port 312C.

This downstream method keeps a data packet moving toward all other nodes of the industrial network and away from the original point where the message entered the ring. The packet will be transmitted to two adjacent ring modules, one in each direction, and continue as two packets along these two separate paths until arriving at the virtual link. Since this fiber segment is an inactive communication link, it can no longer be transmitted around the ring.

In the illustrated instance, a data packet entering the ring from the industrial network from node 360 and is accepted by the PDI (312C) as a valid packet. It is then transmitted into the ring by port A (312A) and port B (312B). Module 320 now receives this packet on port A (322A) while module 350 receives this packet on port B (352B). Module 320 then transmits from port B (322B) and to the industrial network at node 370 while module 350 then transmits from port A (352A) and to the industrial network at node 400. Module 330 (Master) receives (332A) this packet as does module 340 (342B). Modules 330 and 340 both transmit to the industrial network (nodes 380 and 390 respectively), but the virtual link resides between these two modules so this data packet ceases to travel any further.

This virtual link is a pair of glass fiber cables controlled by master module 330 as either an active or inactive communication link. Master module 330 can be predetermined by either hardware or software and only one master is allowed per ring 300. For one ControlNet product embodiment of the invention, a hardware switch 150 (see FIGS. 1A and 1B) is used to select master or slave operation and can be easily accessed from the front of each unit. FIG. 3A master module 330 controls this link by assigning one fiber port, Port 332B, as a "Block Port.". The Virtual Link is created by using the switch setting on the master and the method of message tagging to control adjacent slave port 342A. When ring module 330 is set as the master, the receiver of its Port B is set to block on fiber 335_1 or rather discard all data packets received. Since the normal operation of port 332B of master 330 is to act as a block port, it normally attaches tags containing the block code to each data packet transmitted on fiber 335_2. As the adjacent module (340) receives these data packets it reads the code and acknowledging the block code discards the data packet (no transmit). This 'Block' method on the virtual link continues until this state is changed by a fiber break in another segment in the ring.

Since these two glass fibers (335_1; 335_2) are physically there, but are held in reserve until a fiber is broken in another segment this state makes this link virtually unused thus given the name 'Virtual Link'. A data packet can enter this ring from any node of the industrial network (360; 370; 380; 390; 400) and travel in both directions around the fiber ring without any concern of duplicating previous data packets.

The message instances are sent in the form of data packets, wherein the initiating module, e.g., module 310 in the above-mentioned instance, adds a block or unblock tag to the data packet. (This tag may also be referred to as a block or unblock "code", "pattern" or "signal.") Responsive to whether a data transmission, or light when using SFPs, is detected coming from the fiber, the receiver of each port reports this status to FDRM 130, which sets a block bit that is shifted into the data stream as a tag by the same port's transmitter with each packet. As shown in FIG. 3B, the initial state where no faults are detected, unblock bits are set by the FDRM in the form of a zero or reset state shown as 313A for port A and 313B for port B. The subsequent codes shifted into the data stream and attached as a tag to the packets traveling in both directions (315_2; 355_1) is an unblock code.

Responsive to a module 310, 320, etc. receiving a tagged data packet from a neighboring module in one of the fiber paths (e.g., module 350 receives message from module 310 in CCW path), the module is operable to acknowledge the fault information provided in the received tag, discard this tag, and then add its own tag and forward it's fault status information on to the next downstream neighboring module in that one path (e.g., module 310 forwards a packet to module 350 in the CCW path, module 350 attaches a new tag to the packet and forwards the tag and packet to module 340 in the CCW path. Also, module 350 responds back to 310 with a tag attached to the next data packet traveling in the CW direction). However, if the received tag includes a "block" code, the module receiving this coded message in the tag responsively discards (i.e., "blocks") this data packet, thus no longer forwarding data packets with this code attached. The module will continue this blocking on subsequent data packets having this code attached until the module receives an "unblock" code with a data packet.

Figure 4:
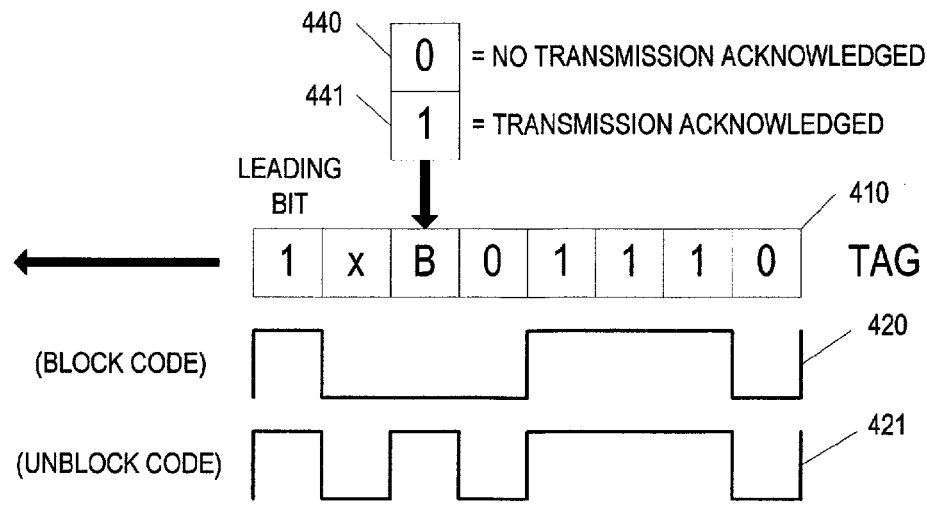
FIG. 4 illustrates one example of the shift register and a tag that is attached to each packet with associated block codes that are transmitted, according to an embodiment of the invention.

More specifically, the block bit in the tag shifted onto each data packet transmitted from a fiber port (such as port 332B, for example) notifies the adjacent ring module (i.e., notifies port 342A of module 340 in the example) of the state of communication received by port 332B from port 342A. This bit has two states that indicate whether a break has occurred in the fiber 335_1 between the receiver of port 332B and the transmitter of port 342A. That is, when a transmission from a port of a first module is detected by a receiving port of a second, adjacent module, the receiving port reports this to FDRM 130 which sets the block bit for the receiving port to a '1' state (441), as shown in FIG. 4, and shifts the 'unblock code' onto the tag (410) attached to the next data packet transmitted back in a data pattern (421) to the port of the first module. See Table 1 below. However, if a loss-of-transmission (shown here as a loss of light transmission) is detected by the port receiver of the second module, then the second module resets the block bit to a '0' state (440) and shifts the 'block code' out in the tag (410) attached to the next data packet transmitted back in a data pattern (420) to the port of the first module. See Table 1.

TABLE 1

Slave Modules - Block Method

| Port-A Receiver | Block Bit A | Port-A Transmitter | Port-B Receiver | Block Bit B | Port-B Transmitter |
|---|---|---|---|---|---|
| a | 1 | unblock code | a | 1 | unblock code |
| a | 1 | unblock code | b | 0 | block code |
| b | 0 | block code | a | 1 | unblock code |
| b | 0 | isolated | b | 0 | isolated | a = light/signal
b = no light/no signal

Figure 3E:
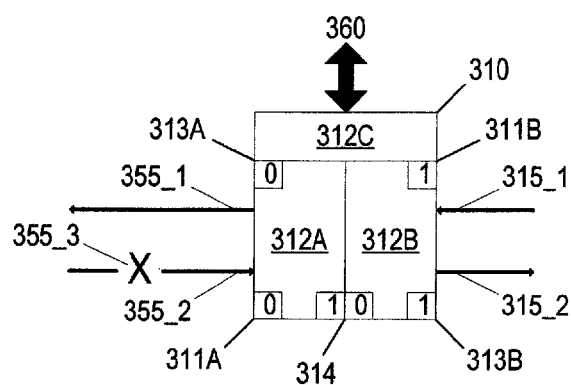
FIGS. 3E and 3F illustrates how the block/unblock tag and status carrier of a slave module responds to loss of transmission, according to an embodiment of the invention.
Figure 3F:
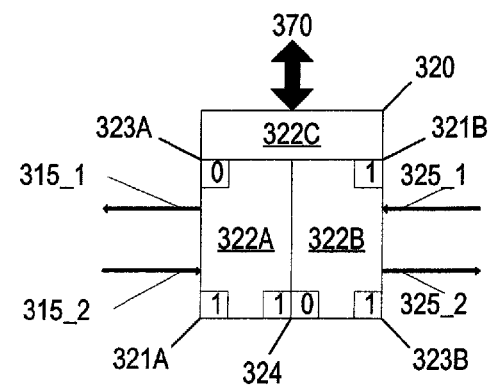
Figure 3D:
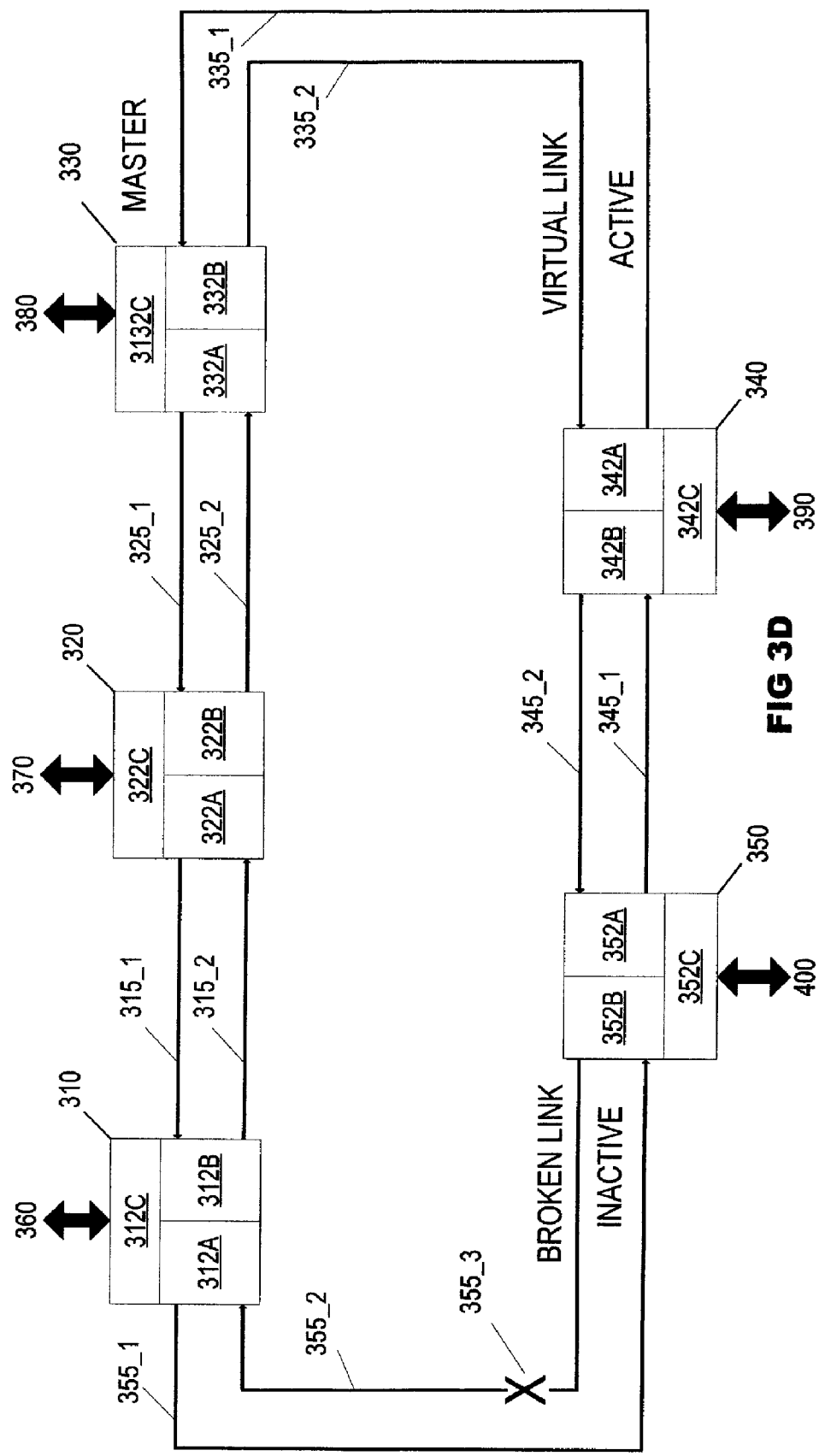
FIG. 3D illustrates a fiber break within a universal communication ring, according to an embodiment of the invention.

Table 1 is provided to show the relationship between the transmitter and receiver of each slave module's fiber ports and to explain how the stimulus at the receiver affects the block bit for its given port (A or B) and the responding code type shifted out to the transmitter of that same port. FIGS. 3A and 3D illustrate the relationship between two adjacent ports connected by fiber. As you can see in the block method for slave modules, each fiber port responds at its own transmitter to the stimulus gathered at the same ports receiver. All slave modules respond identically to this same stimulus. In contrast, the module set as the master has other responses based on this and other stimulus gathered by the receiver at each port. See Table 3.

Also, note that each transmitter shows an 'isolated' state. This is not a code that is sent, but rather a valid isolated state that occurs to modules when neither fiber port on the same module can receive transmissions. All industrial network devices connected to the PDI of a module in this state can't communicate with other device relying on a connection through the fiber ring.

Initialization of Inactive "Virtual Link"

Referring again to FIG. 3A, in an initialization aspect, each module 310-350 includes means of switch 150 (see FIGS. 1A and 1B) for setting the module to master or non-master mode. In one embodiment of the invention, this includes a manual switch to be physically moved by a user. In another embodiment of the invention, this includes a register that may be controlled remotely via appropriate host application software to provide input to a microcontroller incorporated into each module. The user then remotely selects each module to be either a master or a slave module, communicating to the selected module according to its corresponding module ID using the software.

For initialization, in the illustrated instance the master/non-master mode setting means switch 150 is set to "master" mode for module 330 and "non-master" mode for modules 310, 320, 340, and 350. Upon initializing, master module 330 detects the "master" state of its mode setting means switch 150. In response, module 330 blocks packets received in one direction and sends a header tag with a subsequent data packet in the other direction. The header tag includes a "block" indication, i.e., bit pattern.

For example, master module 330 sends the block tag to neighboring module 340 in the CW. Responsive to module 340 receiving the initialization initiated block tag in port 342A from master 330 in a data packet, module 340 does not forward that data packet to module 350 or to local devices at node 390. That is, module 340 responds in the same way described previously as any module does that receives a block code in the tag.

As long as the block tag is received at port 342A, neighboring module 340 responsively blocks the forwarding of data packets received (externally) by port 342A to its own downstream neighbor 350 in that path (CW path in the example) and blocks data to local device 390.

Master module 330 blocks packets received in port 332B (in the CCW path) and continues to send block tags to module 340 so that module 340 keeps blocking packets received in port 342A, unless a time comes when master module 330 receives information indicating that the blocking arrangement should change. That is, the master module will automatically transmit a block code until a fiber break is indicated. This can be caused by a break in the active fiber segment 325 next to the master, which is detected by a loss of transmission, or can be caused by a break in one of the other active fiber segments (315; 345; 355) and reported as a break code in the status carrier sent by one of the slave modules in the ring (310; 320; 340; 350).

From the above explanation the following should be understood. Responsive to detecting mode-setting means upon initialization, master module, e.g., module 330 in the illustrated embodiment, creates an initial communication block on ports 332B and 342A (which has the effect of making the pair of fiber paths between modules 330 and 340 an "inactive virtual link," according to terminology used herein). This initial inactive virtual link breaks the physical ring 300 and prevents the occurrence of a 'message storm' Master module 330 creates this inactive virtual link between two adjacent modules using the above described block code tag method.

(In the illustrated instance, module 330 functions as a master, in at least some respects, and the other modules, 310, 320, 340, and 350, function as non-masters, i.e., slaves, in at least some respects. Note, however, that master module 330 is included in optical communication ring 300 not simply as a control unit. Rather, module 330 includes electrical interface 332C to interface with its local control or data acquisition devices at node 380 to the optical communication ring, in the same arrangement as modules 310, 320, 340, and 350 for their respective local devices at nodes 360, 370, 390, and 400.)

Activating Communication on the Virtual Link Responsive to the Break Method

Master module 330 is notified that there is a break in a fiber path not directly connected to module 330 and, accordingly, that the blocking arrangement should change by, receiving a 'break' code on either port A or B. In response to this notification of a remote fiber path break by receiving a break code, or in response to module 330 itself detecting a break in a fiber path on port 332A that is directly connected to module 330, master module 330 removes the block on port 332B, allowing it to forward subsequent data packets. Likewise, in response to the break code, master module 330 also sends an unblock code in the tag attached to the next data packet transmitted to module 340, in response to reading this code in the tag module 340 begins forwarding data packets to all downstream devices. In this manner, master 330 stops the blocking action on ports 332B and 342A and thereby activates communication in both paths (335_1; 335_2) of the virtual link between modules 330 and 340. This is done because there is now an actual fiber break located somewhere else in a fiber segment of the ring.

In order for a break code to arise and travel around ring 300 to master 330, each non-master module (i.e., modules 310, 320, 340, etc. in the illustrated instance) is operable, responsive to detecting a loss of transmission upstream in a path, to send a break code as the coded signal downstream in that path. This break code is then passed from one module to another around ring 300 until it reaches master module 330. This method of passing the break code around ring 300 is performed using ring registers, as is explained further herein below.

Deactivating Communication in a Link Remote from the Virtual Link Responsive to a Fiber Break Using the Block Method As described above, responsive to detecting a loss of transmission upstream in a path, each non-master module is configured to send a break code downstream in that same path, i.e., responsive to the direction indicated by the ring register. Thus, it should be appreciated that if a non-master module detects a broken link, the module's ring register responsive to the break code notifies the master module to activate the virtual link. In addition, recall that it is also described further above that each module (including the master) is operable to send a block tag with subsequent data packets in the other path (i.e., via the transmitter of the same port that detected the break), and that each receive port of each module is operable to block data responsive to receiving a block tag. Thus, it should also be appreciated that the port detecting the broken fiber path also causes its neighboring module to block data from passing beyond the unbroken path by responsively sending a block code to its neighbor over the unbroken path. Or if both paths of a given fiber segment are broken, the adjacent modules responsive to loss of transmission will perform the block method on each other resulting in the same response. The first of two fiber cables to be repaired responsive to received transmission will try to remove the block method by sending the unblock code. The second fiber cables to be repaired responsive to received transmission will remove the block method by also sending the unblock code. Thus both paths are clear for communication.

More specifically, what most network protocols have in common is that messages are transmitted in data packets. This leaves time between packets for other devices to inject information into the data stream. In an embodiment of the present invention, modules 310, 320, etc. use this gap in time/data to insert a coded break or heal message that can be sent around the ring to reach the master module. It is an efficient way for a module to block data packets responsive to a block code tagged onto the data packets as a way to deactivate a communication link in a fiber segment between two adjacent ring modules. However, in one respect it is problematic that this block method breaks the chain of communication between the blocking module and other industrial network nodes in the ring. That is, due to the blocking some other communication is needed between the blocking module and the master module in order to cause the fiber segment that resides at the 'virtual link' to become an active communication link as shown in FIG. 3D.

Figure 5:
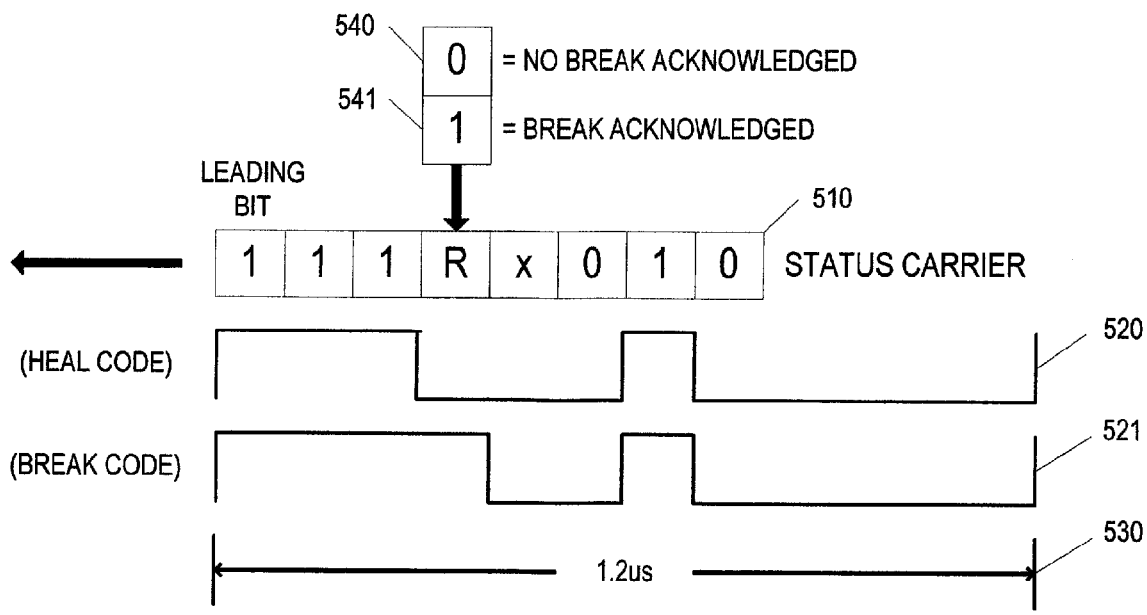
FIG. 5 illustrates one example of the shift register and a break or heal code that is sent in a status carrier between packets, according to an embodiment of the invention.

To address this issue, FDRM 130 uses the gap between packets to communicate fiber status carriers 216 (FIG. 2B). Each carrier is a Non-Return to Zero (NRZ) pattern that is continuously shifted into the data stream until the next data packet arrives to be transmitted from a particular port. For one ControlNet embodiment of the present invention, the interval between each carrier is set to 1.2 μs as shown in FIG. 5 (530). Each coded pattern uses 800 ns of this time with the remainder of the carrier filled with zeros from the shift register. This interval can be adjusted in the firmware if needed to support other protocols.

In an intact ring where no fiber break has occurred each ring register, as shown in FIG. 3B 314. The ring register is a 2-bit register. One bit to acknowledge fiber breaks on port A and a second bit to acknowledge fiber breaks on port B (see FIG. 3C 314). This register used by FDRM to track fiber breaks and determine the direction to send a break code responsive to a fiber break. Responsive to the code shown in ring register 314 the FDRM resetting the 'Break Bits' sent in the fiber status carriers of both port (A and B) to a '0' state (313A; 313B). When a break is reported by a receive port the FDRM acknowledges this by setting these break bits to a '1' state. As shown in FIG. 3E, when a fiber break (355_3) occurs on the receiver of port A (312A). The ring register (314) of the FDRM responds to this by setting the A bit to a '1' state, but as no fault has been report by port B, leaves the B bit reset to the '0' state (314). Responsive to this 2-bit '10' state the FRDM will change the break bit (313B) to a '1' state to be shifted out in the status carriers to the transmitter of port B (312B) and then on to the adjacent module via fiber 315_2 and leave the break bit (313A) reset to a '0' state to shifted out in the status carriers to the transmitter of port A (312A) and then on to the adjacent module via fiber 315_1. As seen in FIG. 5, the break bit has two states and helps to determine the code that is sent in each fiber status carrier signal. As stated above the FDRM controls the state of this break bit to be shifted out in the pattern of the status carrier (510). If no break is acknowledged a '0' bit (540) is shifted into each status carrier and a heal code (520) pattern is transmitted in the direction determined by port selected by the ring register). If a break is acknowledged a '1' bit (541) is shifted into each status carrier and a break code (521) pattern is transmitted in the direction determined by port selected by the ring register, This method allows a different code to be sent in each direction around the ring (example explained below using FIG. 3D).

Ring Registers

Under normal operation, FDGA 130 for each module 110 will detect that the fiber connected to both fiber ports is intact so the fiber status carrier transmitted from each port contains the heal code pattern. However, when a fiber break is detected, the port must respond in order to reroute data around this broken fiber segment.

In order for the master module to receive a fault code from ring modules that are not directly connected, there must be a method of controlling the direction or path these fault codes travel between modules so that this information reaches the master module. This method of transfer is controlled by using a 'Ring Register' to acknowledge the break code and create a method to pass the fault detection message along in the correct direction.

As seen in Table 2 (below), the ring register of a slave module is responsive to both transmission (shown here as light/signal) and the status carriers showing break and heal codes. The FDRM sets each bit to a '1' responsive to no light/no signal being detected or when a 'break code' is received by either port receiver (A or B) and resets that bit to a '0' when light/signal and a 'heal code' is received. Master modules respond differently to the ring register than do slave modules. For more information, see Table 3, which lists these differences.

Master vs. Slave

TABLE 2

Slave Modules - Break Method

| Port-A Receiver | Port-B Receiver | Ring Register A | Ring Register B | Port-A Transmitter | Port-B Transmitter |
|---|---|---|---|---|---|
| a & c | a & c | 0 | 0 | heal code | heal code |
| a & c | b or (a & d) | 0 | 1 | break code | heal code |
| b or (a & d) | a & c | 1 | 0 | heal code | break code |
| b or (a & d) | b or (a & d) | 1 | 1 | break code | break code | a = light/signal
b = no light/no signal
c = heal code
d = break code

Master modules send out the fiber status carrier as well, but only with a heal code (FIG. 5; 520) as the break code is only useful to the master module. Also, in other potential module designs where the receiver cannot detect light the carrier can be used to detect a 'loss of signal' at a port receiver when an optical fiber breaks. As the carrier is shifted out on a regular interval, when data is not be present, a break would still be identified immediately by the loss of transmission detected by the port A receiver.

The state of the virtual link at the Master's port B can be altered by a change in the status of the fiber connected to an adjacent module (block) or a change in status of the fiber between two modules somewhere else in the ring (break). Basically, a block creates an inactive communication link between two adjacent slave modules or a slave that is adjacent to port A of the Master module.

If a fiber break occurs between port A of the master module and an adjacent slave module, the Master sets a block to deactivate the link between these two modules, but the break function is never used. The Master just simply changes the virtual link to an active communication link between port B and its adjacent module.

The break function (FIG. 5; 521) is only used when a fiber break occurs between slave modules (see FIG. 3D; 355_3). Then it is necessary to communicate this break around the ring to the master by sending the break code through the chain of connected ring modules until this code reaches the master. Responsive to the master receiving this break code in a status carrier to activate the communication link (virtual link) between port B of the master module and the adjacent module (340) allowing all network devices remain in contact.

Table 3 is similar to Table 2 in that the Ring Register is still only shown with four different states. However, the stimulus separated by the 'or' expression shown in the receiver A and B columns in table 2 are broken out here as separate states to show how they change the fault codes sent by the transmitter A and B. A Virtual Link column is added here to show how the response varies dependent on the port which has received the stimulus.

TABLE 3

Master Module - Block & Break Methods

| Port-A Receiver | Port-B Receiver | Ring Register A | Ring Register B | Port-A Transmitter | Port-B Transmitter | Virtual Link |
|---|---|---|---|---|---|---|
| a & c | a & c | 0 | 0 | c & e | c & f | inactive |
| a & c | b | 0 | 1 | c & e | c & f | inactive |
| a & c | a & d | 0 | 1 | c & e | c & e | active |
| b | a & c | 1 | 0 | c & f | c & e | active |
| a & d | a & c | 1 | 0 | c & e | c & e | active |
| b | b | 1 | 1 | c & f | c & f | isolated |
| b | a & d | 1 | 1 | c & f | c & e | active |
| a & d | b | 1 | 1 | c & e | c & f | inactive |
| a & d | a & d | 1 | 1 | c & e | c & e | active | a = light/signal
b = no light/no signal
c = heal code
d = break code
e = unblock code
f = block code Also, note that there are instances of an 'isolated' state for the virtual link. This state occurs when the receivers of both port A and port B of the master module acknowledge a fiber break or inactive communication link. All industrial network devices connected to the PDI of this master module in this state can't communicate with other devices relying on a connection through the fiber ring.

Break Management

Looking back at FIG. 3B will show the initial state of a module of an intact ring. Item 314 points to a ring register setting of (0; 0) which instructs both fiber ports (312A; 312B) to transmit heal codes in both directions.

However, if a glass fiber cable is disconnected or somehow broken (see FIG. 3D, item 355_3), the fiber port receiver (312A) attached at this fiber will use FDGA to: Immediately report a disruption in transmission by setting the block bit to a '0' for a break (see FIG. 3E, item 311A)

The fiber break creates a 'Block' of data packets with the broken fiber (355_2).

Tagged data packets with the block code are transmitted (355_1) to the adjacent module (352B). This receiving port of module 350 now discards all packets tagged with this block code. A block in communication is now created between adjacent modules 310 and 350. Blocking ensures that the communication link is inactive and the fiber (355_1: 355_2) is unused.

The block response to the fiber break creates an additional inactive fiber communication link in the overall fiber ring so the 'virtual link' must become an active communication link to ensure delivery of data packets to every network node. A break code must reach the master module in order to change the virtual link into an active communication link. The FDRM of module 350 responds to the loss-of-transmission on fiber 355_2 by:

Sets the 2 Bit ring register to indicate which fiber port reports a broken fiber. The example in FIG. 3E (314) shows, the port A bit is set to a '1'—Ring Register=1; 0.

The break bit for port B acknowledges this break by setting to a '1' (FIG. 3E; 313B).

Port B (312B) transmits a break code on fiber (315_2) to the adjacent downstream module (320) (FIG. 3D).

The break bit for port A (FIG. 3B; 314A) also acknowledges the change in the ring register by remaining reset to a '0'. Port A (312A) continues transmitting a heal code (355_1).

In FIG. 3D, following the transmitted break code from module 310 to module 320 it is received by port A (322). The fiber (315_2) is intact so transmission is received by the port and the block bit remains set to a '1' as shown in FIG. 3F (321A). However, the FDRM also responds to the fiber status carrier at module 320 as follows.

The break code is read by fiber port A (322A)

The ring register (324) of module 320 responds by setting the port A bit of the ring register to a '1' state—Ring Register=1; 0.

Just as before, fiber port B (322B) responds to this ring register setting (1; 0). Port B acknowledges this break by setting the break bit to a '1' (323B).

Port B (322B) now transmits a break code (325_2) to the adjacent downstream module (FIG. 3D; 330).

Again, at FIG. 3F, Port A responds to the ring register setting (1; 0) by leaving the break bit (323A) set to a '0' state and continuing to transmit the heal code (315_1) back to module 310 (FIG. 3D).

Looking again at FIG. 3D, a break code is transmitted by module 320 on fiber 325_2 to the adjacent downstream module. This module is the fiber ring 'Master' for this example. However, the break code will be received and retransmitted by each slave module in the same fashion as shown with FIG. 3F until it is received by the master module of any given fiber ring configuration.

The master module (330) shown in FIG. 3D will respond as follows.

Unblocking the receiver on fiber 335_1 of port B (332B).

The Master will now transmit all good data packets (no errors) received from the upstream adjacent module (340).

The Master now starts attaching the 'unblock' code in the tag of each data packet and transmitting it across the virtual link to the adjacent ring module (340).

The adjacent slave module (340) receiving the 'unblock' code will accept the attached data packet and then transmit it to downstream devices.

The virtual link now becomes an active link for duplex communication between modules 330 and 340.

Conversely when the fiber (FIG. 3D; 355_2) is reconnected or repaired, this returns the state of fiber to an intact ring as shown in FIGS. 3A and B. The attached ring module (310) and associated ring modules respond as follows.

Identifying the return of transmission being received module 310 (FIG. 3B) resets the ring register (314) bit to a '0'—Ring Register=(0; 0) and the block bit (311A) to a '1'. Note changes going from FIG. 3E back to FIG. 3B.

PortA (312A) will now 'block' received data packets for fiber 355_2 for 2 seconds after the link becomes active to ensure all packets traveling though the ring at the time of the repair have left the fiber ring.

Getting back to FIG. 3A, the tag transmitted from port A (312A) changes to the 'unblock' code and is transmitted in the next data packet (355_1) to the downstream module (350).

The port A (312A) break bit responds to the ring register by continuing to shift out a 'heal' code in the fiber status carrier to the transmitter.

The FDRM will respond to the ring register (314) by resetting the break bit to a '0' state and shifts out this code in the fiber status carrier to Port B (312B) transmitting a 'heal' code on fiber 315_2 (changes from FIG. 3E to FIG. 3B).

The downstream module (350) from port A (312A) receives the unblock code on fiber 355_1. This fiber segment (355_1; 355_2) becomes an active communication link again (FIG. 3A).

The downstream module (320) responds to port B (312B) receiving the heal code on fiber 315_2 by changing the port A (322A) ring register bit to '0'—Ring Register=(0; 0). Note changes going from FIG. 3E back to FIG. 3B.

The FDRM responds to the ring register (314) by resetting the break bit to a '0' state and shifts out this code in the fiber status carrier to Port B (322B) transmitting a 'heal' code on fiber 325_2 (changes from FIG. 3E to FIG. 3B).

The master module (330) receives the heal code and responds by reverting back to the initial state by blocking data packets received on port B (332B) and transmitting 'block' codes to the adjacent downstream module (340) (FIG. 3A).

The virtual link once again becomes an inactive communications link as shown in FIG. 3A.

Miscellaneous Remarks and Other Variations

Processes, ports and registers of the communication modules described herein above may be implemented as programmable gate array logic or in other ways, including application specific integrated circuitry, one or more embedded controllers, etc.

The description of the present embodiment has been presented for purposes of illustration, but is not intended to be exhaustive or to limit the invention to the form disclosed. Many modifications and variations will be apparent to those of ordinary skill in the art. Moreover, the processes of the present invention are capable of being distributed in the form of a computer readable medium of instructions. Such computer readable medium may have a variety of forms. The present invention applies equally regardless of the particular type of signal bearing media actually used to carry out the distribution. Examples of computer readable media include recordable-type media such a floppy disc, a hard disk drive, a RAM, and CD-ROM's.

Figure 6:
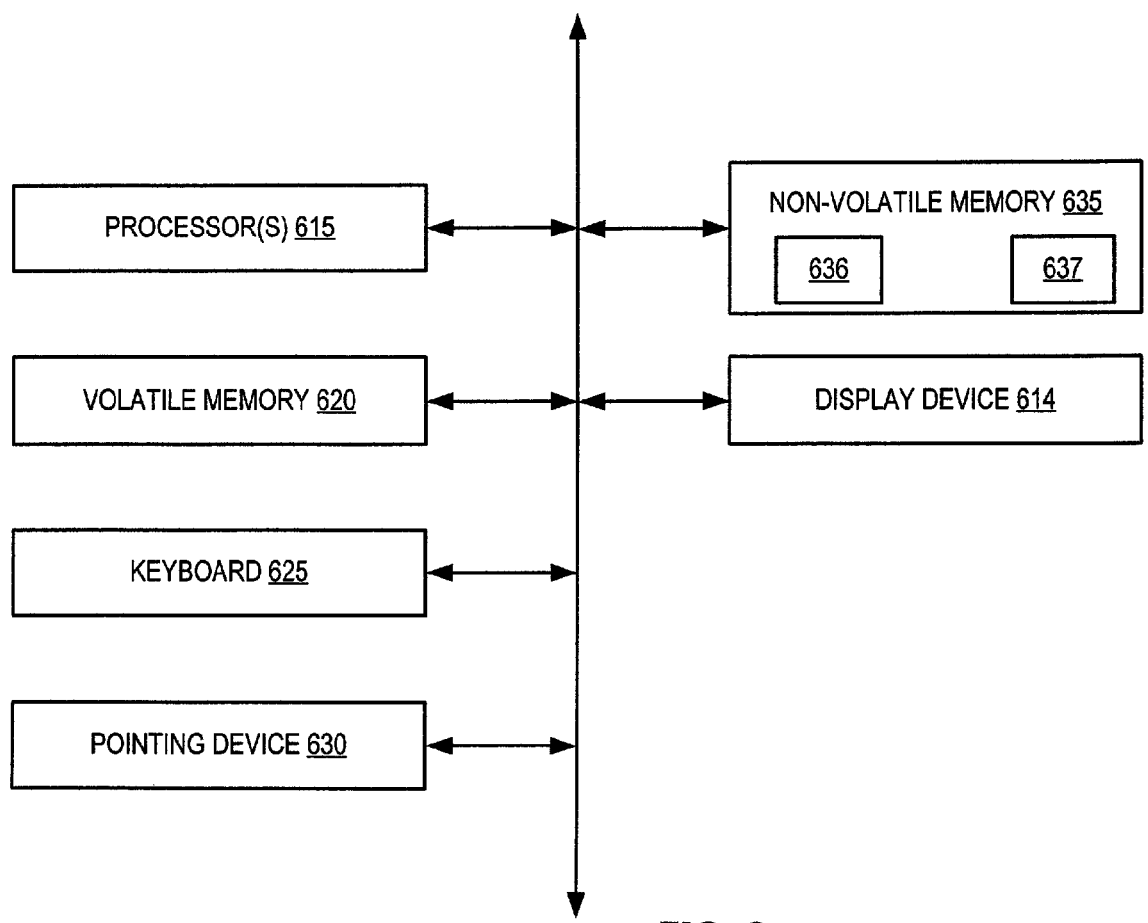
FIG. 6 illustrates a computer system having instructions to implement a method in accordance with an embodiment of the present invention.

Referring now to FIG. 6 an embodiment of the invention is illustrated in which logic for the communication modules described herein takes the form of a computer system 610. It should be understood that the term "computer system" is intended to encompass any device having a processor that executes instructions from a memory medium, regardless of whether referred to in terms of a microcontroller, personal computer system, mainframe computer system, workstation, server, or in some other terminology. Computer system 610 includes a processor 615, a volatile memory 627, e.g., RAM and a nonvolatile memory 629, e.g., ROM. Memory 627 and 629 store program instructions (also known as a "software program"), which are executable by processor 615, to implement various embodiments of a software program in accordance with the present invention. Processor 615 and memories 627 and 629 are interconnected by bus 640. An input/output adapter (not shown) is also connected to bus 640 to enable information exchange between processor 615 and other devices or circuitry. System 610 may also include a keyboard, pointing device, e.g., mouse, nonvolatile memory, e.g., ROM, hard disk, floppy disk, CD-ROM, and DVD, and a display device.

Various embodiments implement the one or more software programs in various ways, including procedure-based techniques, component-based techniques, and/or object-oriented techniques, among others. Specific examples include XML, C, C++ objects, Java and commercial class libraries. Those of ordinary skill in the art will appreciate that the hardware in FIG. 6 may vary depending on the implementation. For example, other peripheral devices may be used in addition to or in place of the hardware depicted in FIG. 6. The depicted example is not meant to imply architectural limitations with respect to the present invention.

The terms "logic," "memory" and "register" are used herein. It should be understood that these terms may also refer to circuitry that is part of a design for an integrated circuit chip, a design for which may be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product.

To reiterate, the embodiments were chosen and described in order to best explain the principles of the invention, the practical application, and to enable others of ordinary skill in the art to understand the invention. Various other embodiments having various modifications may be suited to a particular use contemplated, but may be within the scope of the present invention.

For example, in the ring-configured network described herein, transmission paths between communication modules have been described as being optical fiber paths. It should be understood electrcial transmission media may be used, such as coaxial cable or even paired conductors, which are generally used for less data throughput, according to conventions that are well-known in the art. Unless clearly and explicitly stated, the claims that follow are not intended to imply any particular sequence of actions. The inclusion of labels, such as a), b), c) etc., for portions of the claims does not, by itself, imply any particular sequence, but rather is merely to facilitate reference to the portions.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. An apparatus comprising:
   a plurality of communication modules coupled together in a communication ring, the modules each including a memory device and the modules being operable to send and receive data from peripheral devices, wherein the ring includes a first path operable for propagating a data stream, including control signals and data, from module to module around the ring in a first direction and a second path operable for propagating a data stream, including control signals and data, from module to module around the ring in a second direction, the modules being operable to send and receive the data streams on the paths, wherein each at least one of the modules of the ring is operable, responsive to receiving a predetermined initialization signal, to operate as a master for initially blocking data in the first path and initially sending a block signal to a neighboring module downstream in the second path, and wherein the modules of the ring are operable, responsive to receiving the block signal in one of the paths, to block data in that one of the paths, so that responsive to initialization of one of the modules of the ring as a master, the master and the neighboring module create an inactive virtual link therebetween that prevents data from propagating around the ring more than once.

2. The apparatus of claim 1, wherein modules of the ring are operable to send and receive the data as data packets in the data streams and the master sends the block signal with each data packet sent by the master responsive to receiving a heal signal between data packets sent by the master, wherein the heal signal indicates no break has been detected in any location other than at the inactive virtual link, wherein the master is further operable to send an unblock signal in the second path responsive to receiving a break signal between data packets, wherein the break signal indicates a break in a location other than at the inactive virtual link, and modules of the ring are operable, responsive to receiving an unblock signal in one path, to stop blocking block data in that one path.

3. The apparatus of claim 2, wherein ones of the modules of the ring not initialized as the master are further operable to respond to receiving a break signal by relaying the break signal around the ring to the master.

4. The apparatus of claim 3, wherein modules of the ring are further operable to detect and respond to upstream breaks in the paths, wherein responding to an break in a broken one of the paths includes blocking data in the broken path, sending a break signal to a neighboring module downstream of the break in the broken path, and sending a block signal to a neighboring module in a non-broken one of the paths, so that one of the modules blocks data in a non-broken path responsive to receiving a block signal from a module detecting a break in one of the paths, so that the break signal is relayed to the master, and so that the master and the neighboring module downstream of the master in the second path create an active virtual link in order to allow data to propagate around the ring in spite of the break.

5. The apparatus of claim 2, wherein modules of the ring are operable to send block signals as tags appended to the data packets.

6. The apparatus of claim 2, wherein modules of the ring are operable to send and receive break signals as carrier signals between packets.

7. The apparatus of claim 2, wherein a module of the ring includes shift registers for each path and fault logic coupled to the respective shift registers, and is operable to shift a received data stream through its respective shift register, wherein the fault logic is operable to insert the break and block signals into the received data stream.

8. The apparatus of claim 2, wherein modules of the ring are operable to repeatedly send heal codes to adjacent modules in the ring except when sending data packets, so that receiving modules of the ring can detect communication is intact.

9. A method of communicating in a ring network, the method comprising:
   a) initializing a first link in the ring to block data packet communication in order to prevent duplicate messages from being delivered in the ring, wherein the initializing includes a master communication module sending a block tag in a data packet on the first link;
   b) deactivating a second link in the ring responsive to a break occurring in the second link, wherein the second link is non-adjacent to the master communication module and is between two adjacent communication modules;
   c) reporting the break to the master communication module by a communication module communicating between data packets in the ring; and
   d) activating the first link by the master communication module responsive to the break report, so that the first link provides a replacement for the second link and messages can still be delivered around the ring in spite of the break;
   wherein the ring includes a number of communication modules, each of the modules being capable of operation as the master communication module responsive to receiving a predetermined initialization signal, and wherein a) includes initializing one of the modules to operate as the master module and the master module responsively blocking data in a first path of the first link and initially sending a block signal to a neighboring module downstream in a second path of the first link, and wherein the modules are operable, responsive to receiving the block signal in one of the paths, to block data in that one of the paths, so that responsive to a) the master and the neighboring module downstream initialize the first link as an inactive virtual link in order to prevent data from propagating around the ring more than once.

10. The method of claim 9, comprising:
re-activating the second link responsive to detecting that the second link no longer has a break; and
reporting the non-break in the second link to the master communication module by a communication module communicating between data packets in the ring.

11. The method of claim 10, comprising:
de-activating the first link again by the master communication module responsive to the non-break report, so that the first link again prevents duplicate messages from being delivered in the ring.

12. A computer program product for communication modules coupled together in a communication ring, wherein the ring includes a first path operable for propagating a data stream, including control signals and data, from module to module around the ring in a first direction and a second path operable for propagating a data stream, including control signals and data, from module to module around the ring in a second direction, the computer program product being stored on a computer readable memory, the computer program product having instructions for execution by a computer, wherein the instructions, when executed by the computer, cause the computer to implement a method comprising:
at least one of the one of the modules of the ring receiving an initialization signal and responsively operating as a master module, including blocking data in a first one of the paths and initially sending a block signal to a neighboring module downstream in the second one of the paths,
sending and receiving the data streams on the paths by the communication modules of the ring, wherein the neighboring module blocks data in the second path responsive to receiving the block signal, so that responsive to initialization of one of the modules of the ring as a master, the master and the neighboring module downstream of the master create an inactive virtual link therebetween that prevents data from propagating around the ring more than once.

13. The computer program product of claim 12, wherein sending and receiving the data streams includes sending and receiving data as data packets in the data streams and the method implemented by the computer comprises:
the master sending to the neighboring module the block signal with each data packet sent by the master responsive to receiving a heal signal between data packets sent by the master, wherein the heal signal indicates no break has been detected in any location other than at the inactive virtual link; and
the master sending an unblock signal to the neighboring module responsive to receiving a break signal between data packets, wherein the break signal indicates a break in a location other than at the inactive virtual link, wherein the neighboring module stops blocking data in the second path responsive to receiving the unblock signal.

14. The computer program product of claim 13, wherein the method implemented by the computer comprises:
relaying the break signal around the ring to the master module by ones of the modules of the ring not initialized as the master.

15. The computer program product of claim 14, wherein the method implemented by the computer comprises:
the modules of the ring detecting upstream breaks in the paths, wherein a module detecting a broken path blocks data in the broken path, sends a break signal to a neighboring module downstream of the break, and sends a block signal to a neighboring module in a non-broken one of the paths, so that one of the modules blocks data in a non-broken path responsive to receiving a block signal from a module detecting a break in one of the paths.

16. The computer program product of claim 13, wherein sending the block signals includes sending tags appended to the data packets.

17. The computer program product of claim 13, wherein sending the break signals includes sending carrier signals between packets.

18. The computer program product of claim 13, wherein a module of the ring includes shift registers for each path and fault logic coupled to the respective shift registers, wherein
the modules shift received data streams through their respective shift registers; and
the modules insert the break and block signals into the received data stream.

19. The computer program product of claim 13,
the modules of the ring sending heal codes to respectively adjacent modules in the ring except when sending data packets, so that the respectively adjacent receiving modules of the ring can detect communication is intact.

\* \* \* \* \*